United States Patent
Krish et al.

(10) Patent No.: US 11,546,405 B2
(45) Date of Patent: Jan. 3, 2023

(54) METHODS FOR EXPOSING MAINFRAME DATA AS A WEB SERVICE AND DEVICES THEREOF

(71) Applicant: JPMorgan Chase Bank, N.A., New York, NY (US)

(72) Inventors: Arun Krish, Lithia, FL (US); Hari Sangaraju, Tampa, FL (US)

(73) Assignee: JPMORGAN CHASE BANK, N.A., New York, NY (US)

(*) Notice: Subject to any disclaimer, the term of this patent is extended or adjusted under 35 U.S.C. 154(b) by 211 days.

(21) Appl. No.: 16/126,047

(22) Filed: Sep. 10, 2018

(65) Prior Publication Data

US 2019/0387075 A1 Dec. 19, 2019

Related U.S. Application Data

(60) Provisional application No. 62/686,129, filed on Jun. 18, 2018.

(51) Int. Cl.
| | |
|---|---|
| *H04L 67/01* | (2022.01) |
| *H04L 67/02* | (2022.01) |
| *H04L 67/10* | (2022.01) |
| *H04L 69/16* | (2022.01) |

(52) U.S. Cl.
CPC .............. *H04L 67/01* (2022.05); *H04L 67/02* (2013.01); *H04L 67/10* (2013.01); *H04L 69/16* (2013.01)

(58) Field of Classification Search
CPC ....................................................... H04L 67/42
See application file for complete search history.

(56) References Cited

U.S. PATENT DOCUMENTS

| | | | |
|---|---|---|---|
| 6,792,605 B1 * | 9/2004 | Roberts | H04L 29/06 709/202 |
| 10,397,760 B2 * | 8/2019 | Park | H04W 4/50 |
| 2011/0258305 A1 * | 10/2011 | Chen | H04L 41/20 709/223 |
| 2012/0209947 A1 * | 8/2012 | Glaser | G06F 9/5027 709/217 |
| 2016/0117207 A1 * | 4/2016 | Bellessort | G06F 9/547 719/328 |
| 2016/0149858 A1 * | 5/2016 | Asaithambi | H04L 63/029 726/12 |
| 2016/0352867 A1 * | 12/2016 | Subbarayan | H04L 41/0893 |
| 2018/0139001 A1 * | 5/2018 | Yang | H04H 60/76 |
| 2018/0217819 A1 * | 8/2018 | Leen | G06F 8/41 |
| 2018/0315004 A1 * | 11/2018 | Lecourtier | G06Q 10/083 |
| 2019/0222638 A1 * | 7/2019 | Keller | H04L 67/10 |

* cited by examiner

*Primary Examiner* — Jeffrey R Swearingen
(74) *Attorney, Agent, or Firm* — Greenblum & Bernstein, P.L.C.

(57) ABSTRACT

Methods, non-transitory computer readable media, and web service management apparatus that assists with exposing mainframe data as a web service include receiving a web service request from a client device. Data in the received web service request is identified. One or more drivers and one or more functional application programming interfaces (APIs) are identified based on the identified data. Provide response data from a mainframe system based on the execution of the identified one or more functional APIs.

18 Claims, 7 Drawing Sheets

FIG. 7

METHODS FOR EXPOSING MAINFRAME DATA AS A WEB SERVICE AND DEVICES THEREOF

This application claims the benefit of U.S. Provisional Patent Application Ser. No. 62/686,129, filed Jun. 18, 2018, which is hereby incorporated by reference in its entirety.

FIELD

This technology generally relates to methods and devices for managing web service and, more particularly, to methods for exposing mainframe data as a web service and devices thereof.

BACKGROUND

Prior mainframe applications primarily process the data as mainframe batch cycle and the front end for these mainframe applications are developed in distributed technology considering the ease of use. Accordingly, all the requests received at the front end are routed through an additional application server before it gets routed to the mainframe systems.

Unfortunately, routing through the additional application server results in the increased response time for the requesting client device. Additionally, the prior technologies also require additional infrastructure, software licensing, and resource costs to maintain the additional application server. Furthermore, when there are errors reported while processing the request to the mainframe systems, existing technologies makes it difficult to debug as the request is routed through the additional application server which is present in different environments

SUMMARY

A method for exposing mainframe data as a web service includes exposing mainframe data as a web service include receiving a web service request from a client device. Data in the received web service request is identified. One or more drivers and one or more functional application programming interfaces (APIs) are identified based on the identified data. Provide response data from a mainframe system based on the execution of the identified one or more functional APIs.

A non-transitory computer readable medium having stored thereon instructions for exposing mainframe data as a web service comprising machine executable code which when executed by at least one processor, causes the processor to perform steps including, exposing mainframe data as a web service include receiving a web service request from a client device. Data in the received web service request is identified. One or more drivers and one or more functional application programming interfaces (APIs) are identified based on the identified data. Provide response data from a mainframe system based on the execution of the identified one or more functional APIs.

A web service management apparatus including at least one of configurable hardware logic configured to be capable of implementing or a processor coupled to a memory and configured to execute programmed instructions stored in the memory to expose mainframe data as web service includes receiving a web service request from a client device. Data in the received web service request is identified. One or more drivers and one or more functional application programming interfaces (APIs) are identified based on the identified data. Provide response data from a mainframe system based on the execution of the identified one or more functional APIs.

This technology provides a number of advantages including providing a method, non-transitory computer readable medium, and apparatus that exposes mainframe data as web service. Additionally, by using TCP/IP connection, using the TCP/IP connection, the disclosed technology is able to provide the requesting client, a fault tolerant, fast and efficient access to the data in the mainframe systems. By eliminating the additional hop of routing the request through the application server to obtain the data from the mainframe system, the disclosed technology is able to provide quicker response to the client device when compared to the prior technologies. Furthermore, by eliminating the application server, the disclosed technology is able to reduce the infrastructure cost used to maintain the application server. The disclosed architecture can also be used while transitioning from legacy applications to newer applications.

BRIEF DESCRIPTION OF THE DRAWINGS

FIG. 7 is an exemplary illustration of a response that is sent back to the client device.

DETAILED DESCRIPTION

Figure 1:
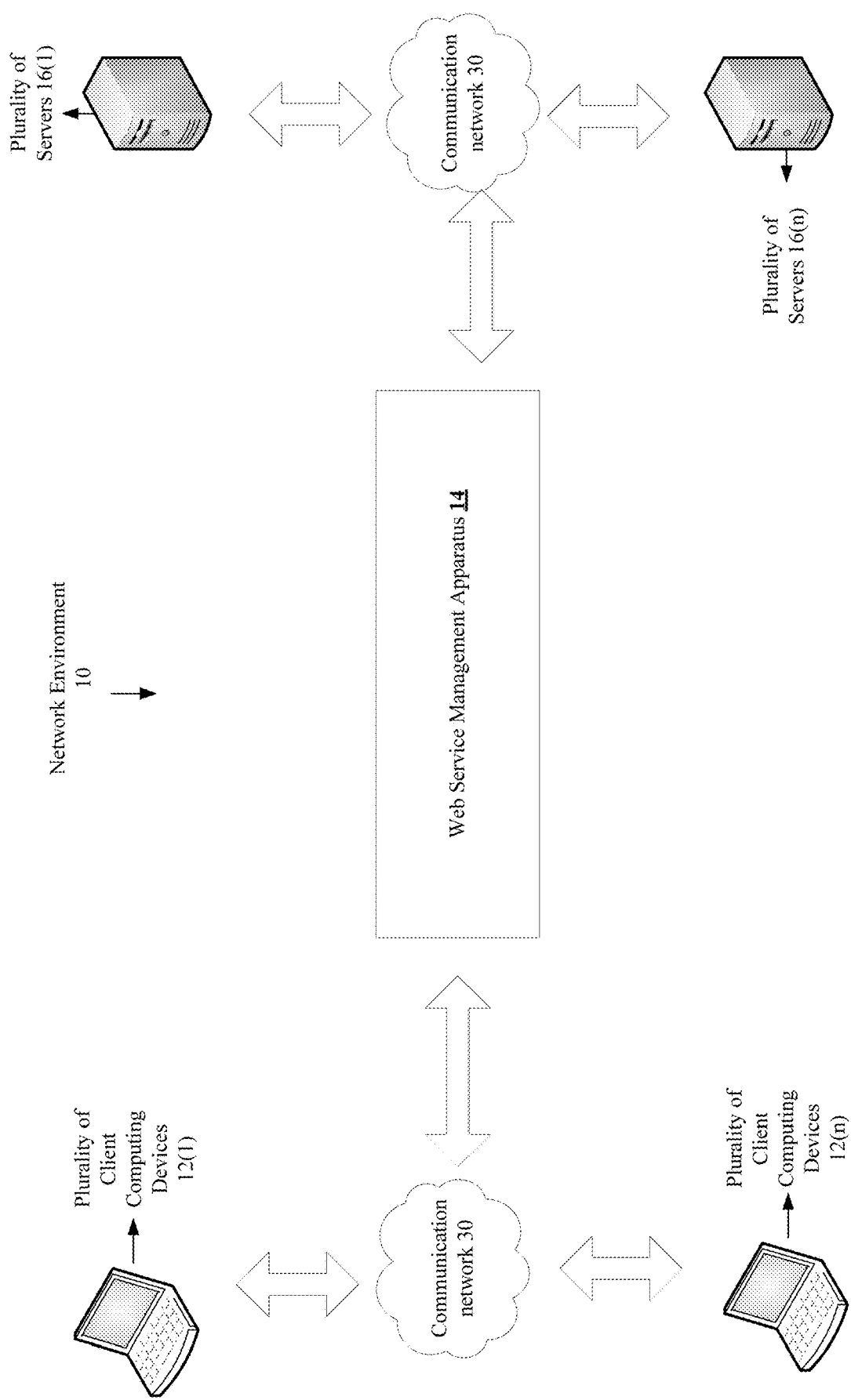
FIG. 1 is an example of a network environment including a web service management apparatus for exposing mainframe data as web service.
Figure 2:
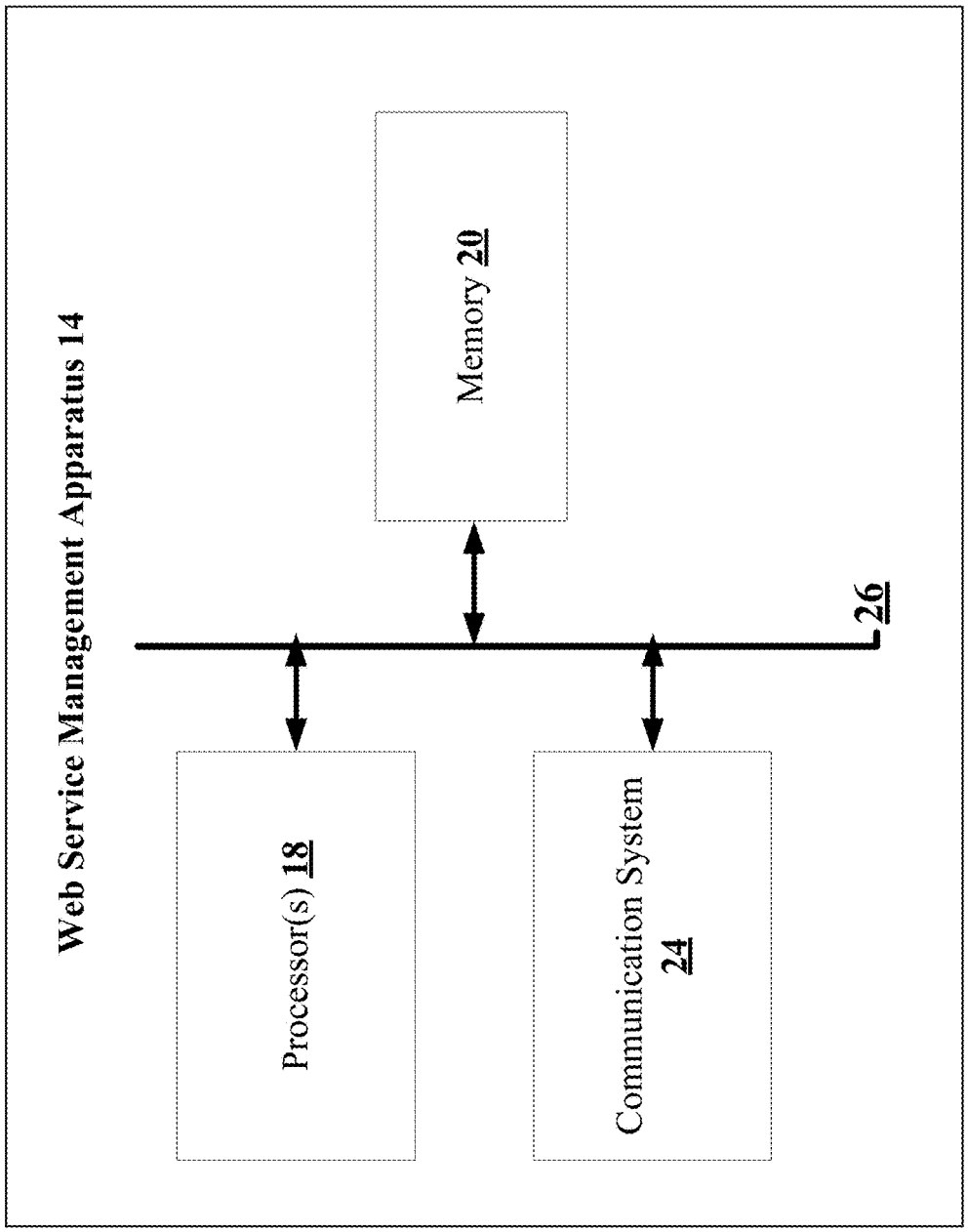
FIG. 2 is an example of a block diagram of the web service management apparatus.
Figure 3:
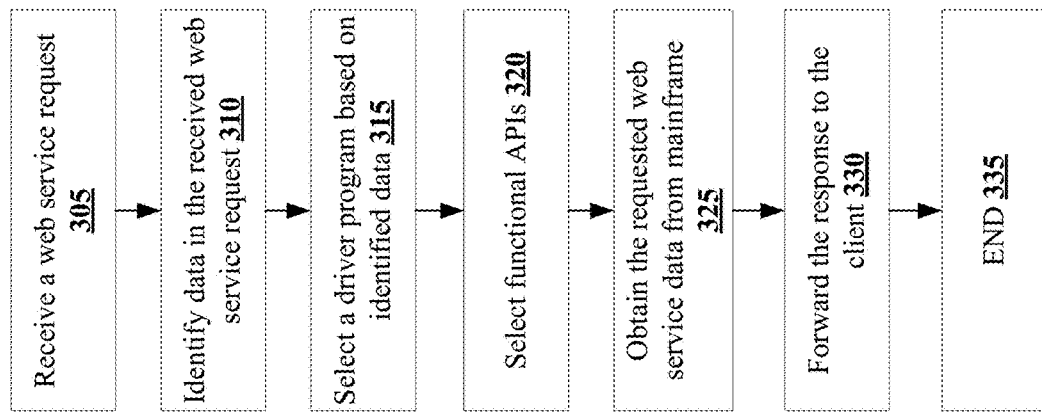
FIG. 3 is an exemplary flowchart of a method for exposing mainframe data as web service.

A network environment 10 with an example of a web service management apparatus 14 is illustrated in FIGS. 1-2. In this particular example, the environment 10 includes the web service management apparatus 14, client computing devices 12(1)-12(n), plurality of mainframe systems 16(1)-16(n) coupled via one or more communication networks 30, although the environment could include other types and numbers of systems, devices, components, and/or other elements as is generally known in the art and will not be illustrated or described herein. This technology provides a number of advantages including providing methods, non-transitory computer readable medium, and apparatuses that exposes mainframe data as web service.

Referring more specifically to FIGS. 1-2, the web service management apparatus 14 is programmed to exposes mainframe data as web service, although the apparatus can perform other types and/or numbers of functions or other operations and this technology can be utilized with other types of claims. In this particular example, the web service management apparatus 14 includes a processor 18, a memory 20, and a communication system 24 which are coupled together by a bus 26, although the web service management apparatus 14 may comprise other types and/or numbers of physical and/or virtual systems, devices, components, and/or other elements in other configurations.

Figure 5:
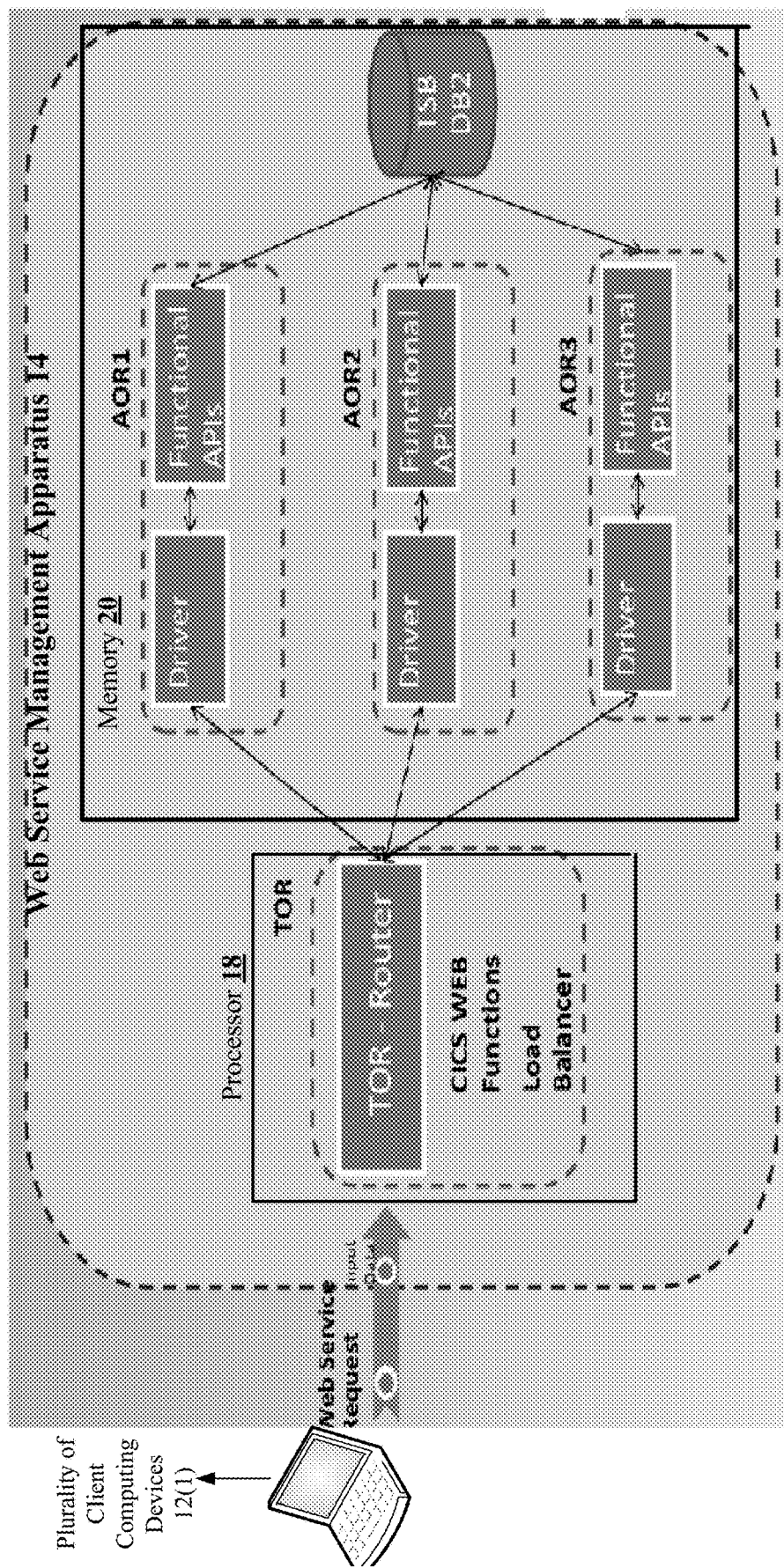
FIGS. 5-6 are an exemplary data flow diagrams for selecting a driver and a functional application programming interface.

The processor 18 in the web service management apparatus 14 may execute one or more programmed instructions stored in the memory 20 for exposes mainframe data as web service as illustrated and described in the examples herein, although other types and numbers of functions and/or other operations can be performed. The processor 18 in the web service management apparatus 14 may include one or more central processing units and/or general purpose processors with one or more processing cores, for example. Additionally, as illustrated in FIG. 5, the processor can be configured to perform the operation of load balancing to select either a driver and functional API or an account owning region based on the workload, although the processor can be configured to perform an additional operations necessary to expose mainframe data as a web service.

The memory 20 in the web service management apparatus 14 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20. Additionally, as illustrated in FIG. 5, the memory 20 also includes multiple drivers and functional API's, collectively called account owning region, along with additional database, although the memory 20 can include other types or amounts of information.

The communication system 24 in the web service management apparatus 14 operatively couples and communicates between one or more of the client computing devices 12(1)-12(n) and one or more of the plurality of mainframe systems 16(1)-16(n), which are all coupled together by one or more of the communication networks 30, although other types and numbers of communication networks or systems with other types and numbers of connections and configurations to other devices and elements. By way of example only, the communication networks 30 can use TCP/IP over Ethernet and industry-standard protocols, including NFS, CIFS, SOAP, XML, LDAP, SCSI, and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like.

In this particular example, each of the client computing devices 12(1)-12(n) may interact with applications executing on the web service management apparatus 14 and/or the plurality of mainframe systems 16(1)-16(n), although the plurality of client computing devices 12(1)-12(n) can interact with the web service management apparatus 14 or the plurality of mainframe systems 16(1)-16(n). Each of the client computing devices 12(1)-12(n) may include a processor, a memory, user input device, such as a keyboard, mouse, and/or interactive display screen by way of example only, a display device, and a communication interface, which are coupled together by a bus or other link, although each may have other types and/or numbers of other systems, devices, components, and/or other elements.

The plurality of mainframe systems 16(1)-16(n) may store and provide data files, by way of example only, to the web service management apparatus 14 via one or more of the communication networks 30, for example, although other types and/or numbers of storage media in other configurations could be used. Additionally, the plurality of mainframe systems 16(1)-16(n) hosts a plurality of applications that the plurality of client computing devices 12(1)-12(n) can access via the data analytics management apparatus 14. In this particular example, each of the plurality of mainframe systems 16(1)-16(n) may comprise various combinations and types of storage hardware and/or software and represent a system with multiple network server devices in a data storage pool, which may include internal or external networks. Various network processing applications, such as CIFS applications, NFS applications, HTTP Web Network server device applications, and/or FTP applications, may be operating on the plurality of mainframe systems 16(1)-16(n) and may transmit data in response to requests from the web service management apparatus 14. Each the plurality of mainframe systems 16(1)-16(n) may include a processor, a memory, and a communication interface, which are coupled together by a bus or other link, although each may have other types and/or numbers of other systems, devices, components, and/or other elements.

Although the exemplary network environment 10 with the web service management apparatus 14, the plurality of client computing devices 12(1)-12(n), the plurality of mainframe systems 16(1)-16(n), and the communication networks 30 are described and illustrated herein, other types and numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices, apparatuses, and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 4:
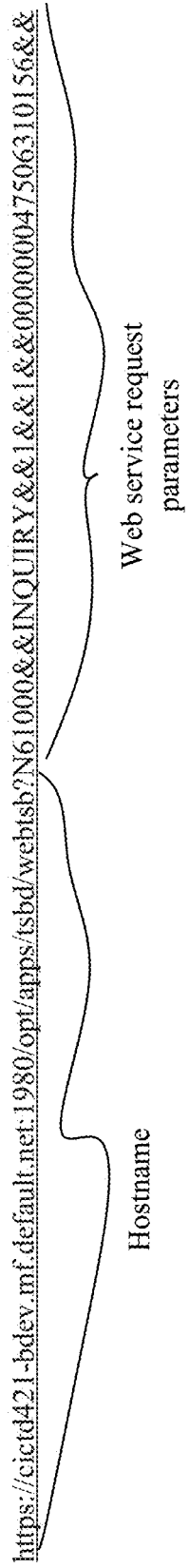
FIG. 4 is an exemplary illustration of a web service request received from a client device.

An example of a method for exposing mainframe data as a web service will now be described with reference to FIGS. 1-7. In particular, referring to FIG. 3 the exemplary method begins at step 305 where the web service management apparatus 14 receives a web service request from one of the plurality of client computing devices 12(1)-12(n), although the web service management apparatus can receive other types or amounts of requests. In this example, the web service request received by the web service management apparatus 14 is through a TCP/IP connection, although the request can be received other types of network connections. Additionally in this example, the received web service request can be inform of a uniform resource locator (URL), although the request can be in other forms. By way of example, FIG. 4 illustrates an example of the received web request with the hostname portion and multiple web service request parameters portion, although other types of web service request can be received. By using the TCP/IP connection, the disclosed technology is able to provide the requesting one of the plurality of client computing devices 12(1)-12(n), a fault tolerant, fast and efficient access to the data in the mainframe systems. Furthermore, by using the TCP/IP connection, the disclosed technology is able to support a two way secured socket layer (SSL) connection, functional identification authentication, user access verification. Alternatively, in another example, the web service management apparatus 14 can receive a request based on an event from one of the plurality of mainframe systems 16(1)-16(n) to trigger another event on a distributed application executing in one of the plurality of client computing devices 12(1)-12(n) via a messaging platform using post HTTP messages such as GET, PUT, or POST.

Next in step 310, the web service management apparatus 14 identifies the data in the received web service request. By way of example, the web service management apparatus 14 identifies the data in the received URL and the identified data can include the name and type of the function that the requesting one of the plurality of client devices 12(1)-12(n) is requesting to access, although the identified data can include other types of information. In this example, the web service parameters illustrated in FIG. 4 includes the data in the received web service request.

Figure 6:
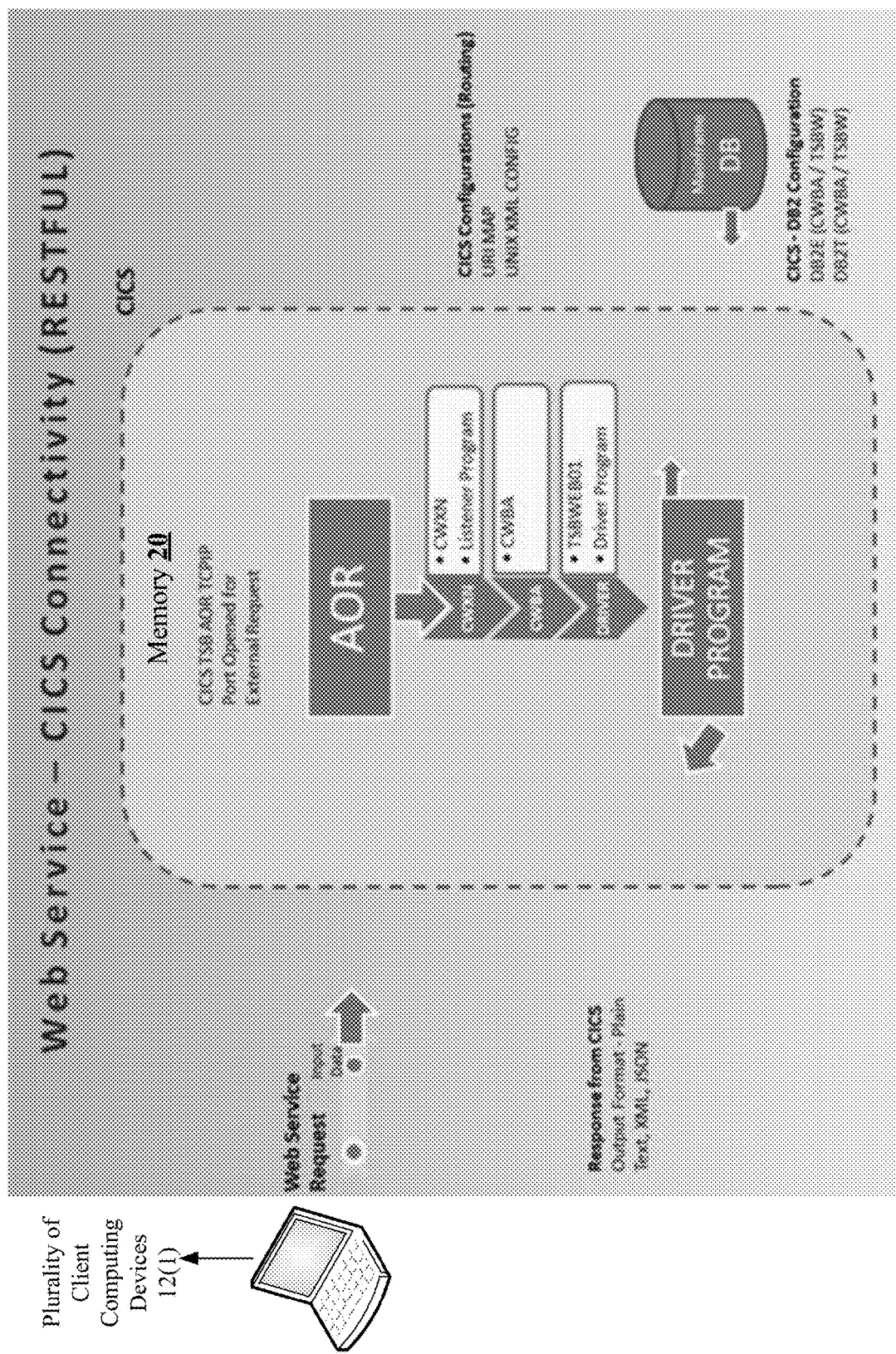

In step 315, the web service management apparatus 14 selects one of the plurality of drivers within memory 20 for the received request based on the identified data, although the web service management apparatus 14 can select the one of the plurality of drivers based on other types or amounts of parameters. Additionally in this example, the web service management apparatus 14 can also select the one of the plurality of drivers using a load balancing technique and an example of selecting the driver is illustrated in FIGS. 5 and 6. In this example, a driver relates to a software component that enables the operating system and a device to communicate with each other, although the driver in this example can be configured to perform other types of functions to expose the mainframe data as a web service. In this example, the load balancing technique used to select the driver within the memory 20 can be round robin, although the driver can be selected based on the amount of load currently handled by the driver.

In step 320, the web service management apparatus 14 selects one or more functional application program interfaces (APIs) based on the selected driver. In this example, the functional APIs is a mainframe program that assists with exposing the mainframe data to the web service request, although the APIs can be configured to perform other types or amounts of functions. Alternatively, in another example, the web service management apparatus 14 can select an account owning region (AOR) that includes both the driver and the corresponding functional API based on load balancing technique and identified data in the requested web service. In this example, the load balancing techniques that can be used to select the account owning region (AOR) is similar to the techniques used to select the driver illustrated above in step 315. Additionally, when all of the account owning regions are managing workload that is equal to the threshold, the web service management apparatus 14 is able to add more account owning region to manage the received request. On the contrary, when there is reduced workload for each of the AOR, the web service management apparatus 14 can determine to reduce the AOR. An example of the web service management apparatus 14 selecting the AOR is illustrated in FIG. 5. Furthermore, the AOR includes both the necessary driver and the functional APIs that are required to service the received web service request. By routing the received request using the load balancer to the corresponding driver and functional API, the disclosed technology is able to provide a scalable and a fault tolerant architecture.

In step 325, the web service management apparatus 14 assists with the execution of the selected functional API and through the execution, the technology is able to expose the mainframe data to a web service. By executing the functional APIs, the web service management apparatus 14 obtains the requested web service data from one of the plurality of mainframe systems 16(1)-16(n), although the web service management apparatus 14 can obtain the requested web service data from other locations. In this example, the functional API can interact with a database to obtain the data or functions necessary to expose the data in the mainframe to the web service request and can then convert the mainframe output response to JSON or XML format so that the distributed system can consume the web service response. Additionally in another example, the web service management apparatus 14 can also use the APIs to perform data modifying operations on the database.

Figure 7:
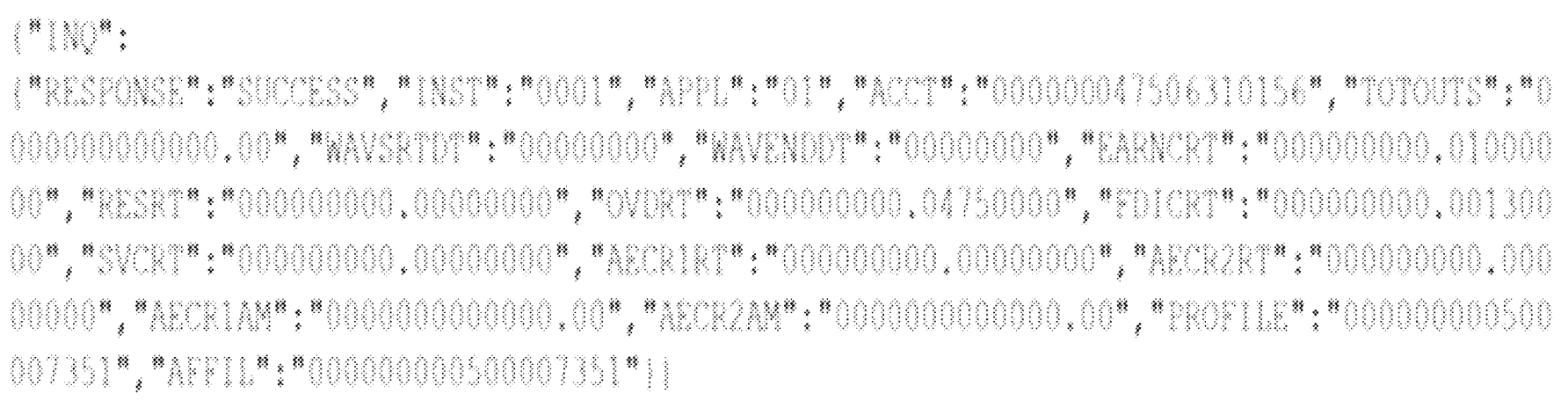

In step 330, the web service management apparatus 14 returns a response back to the requesting one of the plurality of client computing devices 12(1)-12(n) in format such as plain text, XML or JSON, although the service management apparatus 14 can return the response in other formats. By way of example, the response could be the data requested in the web service request from a mainframe system or the response could also be an error message, although the web service management apparatus 14 can return other types of responses back to the requesting one of the plurality of client computing devices 12(1)-12(n). An example of the response is illustrated in FIG. 7. By way of example, the web service request received in FIG. 4 triggers an account inquiry function (with input parameters function name=inquiry, key=account's primary key) and the response illustrated in FIG. 7 includes the account parameters obtained from the mainframe system in a JSON format. Additionally, in this example, if the format of a response is not a plain text, XML, or JSON, the identified driver is able to convert the response to either the plain text, XML, or the JSON prior to sending it back to the requesting one of the plurality of client computing devices 12(1)-12(n).

Alternatively, in another example, the web service management apparatus 14 can provide a web interface using which the plurality of client computing devices 12(1)-12(n) can directly interact with the plurality of mainframe systems 16(1)-16(n) for sending JAVA web service requests and receiving a response from the plurality of mainframe systems 16(1)-16(n). By providing the web interface, the disclosed technology is able to provide some of the most advanced user interface with rich user experience without compromising security and speed.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for exposing mainframe data to web service, the method comprising:
    receiving, by a web service management apparatus, a web service request from a client device, the web service request including a uniform resource locator;
    identifying, by the web service management apparatus, data in the received web service request, the data including a name of a mainframe function and a type of the mainframe function from within the uniform resource locator;
    identifying, by the web service management apparatus, one or more drivers from a plurality of drivers based on the identified data;
    selecting, by the web service management apparatus, one or more functional application programming interfaces (APIs) based on the one or more identified drivers;
    executing, by the web service management apparatus, the one or more functional APIs to obtain information relating to the web service request from at least one mainframe system;
    converting, by the web service management apparatus using the executed one or more functional APIs, response data from the at least one mainframe system into a data format that is consumable by a distributed system, the response data including an error message;
    providing, by the web service management apparatus to the client device, the converted response data from the at least one mainframe system based on the execution of the identified one or more functional APIs; and
    providing, by the web service management apparatus to the client device, a web interface that is usable by the client device to directly interact with the at least one mainframe system.

2. The method as set forth in claim 1 wherein the web service request is received via a TCP connection.

3. The method as set forth in claim 1 wherein the provided response data is in a format comprising one or more of: a plain text format, an XML format, or a JSON format.

4. The method as set forth in claim 1 wherein the one or more drivers and the one or more functional APIs are identified based on a load balancing technique.

5. The method as set forth in claim 4 wherein the load balancing technique includes at least one from among a round robin load balancing technique and an amount of load currently handled technique.

6. The method as set forth in claim 1 further comprising, providing, by the web service management apparatus, an interface for the client device to communicate with the mainframe system for a JAVA web service request.

7. A non-transitory computer readable medium having stored thereon instructions for exposing mainframe data to web service comprising executable code, which when executed by at least one processor, cause the processor to:
    receive a web service request from a client device, the web service request including a uniform resource locator;
    identify data in the received web service request, the data including a name of a mainframe function and a type of the mainframe function from within the uniform resource locator;
    identify one or more drivers from a plurality of drivers based on the identified data;
    select one or more functional application programming interfaces (APIs) based on the one or more identified drivers;
    execute the one or more functional APIs to obtain information relating to the web service request from at least one mainframe system;
    convert, by using the executed one or more functional APIs, response data from the at least one mainframe system into a data format that is consumable by a distributed system, the response data including an error message;
    provide the converted response data from the at least one mainframe system to the client device based on the execution of the identified one or more functional APIs; and
    provide, to the client device, a web interface that is usable by the client device to directly interact with the at least one mainframe system.

8. The medium as set forth in claim 7 wherein the web service request is received via a TCP connection.

9. The medium as set forth in claim 7 wherein the provided response data is in a format comprising one or more of: a plain text format, an XML format, or a JSON format.

10. The medium as set forth in claim 7 wherein the one or more drivers and the one or more functional APIs are identified based on a load balancing technique.

11. The medium as set forth in claim 10 wherein the load balancing technique includes at least one from among a round robin load balancing technique and an amount of load currently handled technique.

12. The medium as set forth in claim 7 further comprising, providing an interface for the client device to communicate with the mainframe system for a JAVA web service request.

13. A web service management apparatus comprising:
    a processor; and
    a memory coupled to the processor which is configured to be capable of executing programmed instructions comprising and stored in the memory to:
    receive a web service request from a client device, the web service request including a uniform resource locator;
    identify data in the received web service request, the data including a name of a mainframe function and a type of the mainframe function from within the uniform resource locator;
    identify one or more drivers from a plurality of drivers based on the identified data;
    select one or more functional application programming interfaces (APIs) based on the one or more identified drivers;
    execute the one or more functional APIs to obtain information relating to the web service request from at least one mainframe system;
    convert, by using the executed one or more functional APIs, response data from the at least one mainframe system into a data format that is consumable by a distributed system, the response data including an error message;

provide the converted response data from the at least one mainframe system to the client device based on the execution of the identified one or more functional APIs; and provide, to the client device, a web interface that is usable by the client device to directly interact with the at least one mainframe system.

14. The apparatus as set forth in claim 13 wherein the web service request is received via a TCP connection.

15. The apparatus as set forth in claim 13 wherein the provided response data is in a format comprising one or more of: a plain text format, an XML format, or a JSON format.

16. The apparatus as set forth in claim 13 wherein the one or more drivers and the one or more functional APIs are identified based on a load balancing technique.

17. The apparatus as set forth in claim 16 wherein the load balancing technique includes at least one from among a round robin load balancing technique and an amount of load currently handled technique.

18. The apparatus as set forth in claim 13 wherein the processor is further configured to be capable of executing the stored programmed instructions to provide an interface for the client device to communicate with the mainframe system for a JAVA web service request.

* * * * *